(12) United States Patent
Chowdhury et al.

(10) Patent No.: US 10,177,614 B2
(45) Date of Patent: Jan. 8, 2019

(54) LOW COST PERMANENT MAGNET MOTOR FOR AN ELECTRIC POWER STEERING SYSTEM

(71) Applicant: Steering Solutions IP Holding Corporation, Saginaw, MI (US)

(72) Inventors: Mazharul H. Chowdhury, Midland, MI (US); Mohammad S. Islam, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 153 days.

(21) Appl. No.: 14/543,965

(22) Filed: Nov. 18, 2014

(65) Prior Publication Data
US 2015/0137629 A1 May 21, 2015

Related U.S. Application Data

(60) Provisional application No. 61/905,606, filed on Nov. 18, 2013.

(51) Int. Cl.
*H02K 1/27* (2006.01)

(52) U.S. Cl.
CPC .......... *H02K 1/276* (2013.01); *H02K 1/2766* (2013.01)

(58) Field of Classification Search
CPC ........ H02K 1/27; H02K 1/276; H02K 1/2766; H02K 1/2753; H02K 15/03; H02K 21/14
USPC ............ 310/156.38, 156.48, 156.68, 156.53, 310/156.56, 51
See application file for complete search history.

(56) References Cited

U.S. PATENT DOCUMENTS 5,962,944 A * 10/1999 Narita .................... H02K 1/276
                                                                            310/112
6,147,428 A    11/2000  Takezawa et al.
6,794,784 B2   9/2004   Takahashi et al.
(Continued)

FOREIGN PATENT DOCUMENTS

CN          103780038 A    5/2014
CN          203911704 U    10/2014
(Continued)

OTHER PUBLICATIONS

DE 102012020927—Description, English translation.*
(Continued)

*Primary Examiner* — Naishadh Desai
(74) *Attorney, Agent, or Firm* — Cantor Colburn LLP

(57) ABSTRACT

A rotor includes an inner wall and an outer wall, where the inner wall forms a space and is radially centered along a central longitudinal axis of the rotor. The rotor further includes a first magnetic pair of legs corresponding to a first pole. The first leg and a second leg of the first magnetic pair of legs are disposed within the rotor, and a first angular distance between the first leg and the second leg decreases from the outer wall to the inner wall. A second magnetic pair of legs corresponding to a second pole that differs from the first pole, a third leg and a fourth leg of the second magnetic pair of legs being disposed within the rotor to extend radially inward from the outer wall toward the inner wall, a second angular distance between the third leg and the fourth leg decreases from the outer wall to the inner wall.

8 Claims, 3 Drawing Sheets

(56) References Cited

U.S. PATENT DOCUMENTS

| | | |
|---|---|---|
| 7,151,335 B2 | 12/2006 | Tajima et al. |
| 7,612,480 B2 | 11/2009 | Fujii et al. |
| 8,319,387 B2 | 11/2012 | Maemura et al. |
| 8,461,737 B2 | 6/2013 | Feng et al. |
| 8,546,990 B2 | 10/2013 | Suzuki et al. |
| 8,598,763 B2 | 12/2013 | Aota et al. |
| 9,698,636 B2 | 7/2017 | Matsuoka |
| 2001/0017499 A1* | 8/2001 | Kaneko ............... H02K 1/2766 310/156.38 |
| 2004/0080228 A1 | 4/2004 | Ahn et al. |
| 2005/0104468 A1 | 5/2005 | Araki et al. |
| 2007/0063607 A1 | 3/2007 | Hattori |
| 2007/0103024 A1* | 5/2007 | Nakayama ........... H02K 1/2766 310/156.53 |
| 2008/0007131 A1 | 1/2008 | Cai et al. |
| 2012/0126637 A1* | 5/2012 | Ankeney ................. H02K 1/02 310/43 |
| 2012/0217834 A1 | 8/2012 | Lutz et al. |
| 2013/0113323 A1 | 5/2013 | Yamada et al. |
| 2013/0207507 A1 | 8/2013 | Han et al. |
| 2014/0001910 A1 | 1/2014 | Shibata |
| 2014/0232232 A1 | 8/2014 | Yamaguchi et al. |
| 2014/0306569 A1 | 10/2014 | Kojima et al. |
| 2015/0001970 A1* | 1/2015 | Zhang .................... H02K 21/16 310/43 |
| 2015/0001981 A1 | 1/2015 | Hattori et al. |
| 2015/0318745 A1 | 11/2015 | Matsuoka |
| 2015/0318746 A1 | 11/2015 | Miyajima |
| 2016/0141927 A1 | 5/2016 | Ortega |

FOREIGN PATENT DOCUMENTS

| | | | |
|---|---|---|---|
| DE | 4033454 A1 | 4/1992 | |
| DE | 102012020927 A1 * | 9/2013 | ............ H02K 21/16 |
| EP | 1128522 A1 | 8/2001 | |
| EP | 2139093 A2 | 12/2009 | |
| EP | 2528207 A1 | 11/2012 | |
| EP | 2680403 A2 | 1/2014 | |
| JP | 2000060038 A | 2/2000 | |
| JP | 2001251825 A1 | 9/2001 | |
| JP | 2001339885 A | 12/2001 | |
| JP | 2004104962 A | 4/2004 | |
| JP | 2007336671 A | 12/2007 | |
| JP | 2010004671 A | 1/2010 | |
| JP | 2013192294 A | 9/2013 | |
| WO | 2007008110 A1 | 1/2007 | |
| WO | 201303118 A1 | 7/2013 | |

OTHER PUBLICATIONS

International Search Report; International Application No. PCT/US2014/066078; International Filing Date: Nov. 18, 2014; dated Feb. 25, 2015; 3 pages.

Written Opinion of International Searching Authority; International Application No. PCT/US2014/066078; International Filing Date: Nov. 18, 2014; dated Feb. 25, 2015; 5 pages.

Extended European search report for related European application No. 15194970.8, dated Jul. 13, 2016, pp. 8.

Search Report regarding related EP App. No. 14862913.2; dated Apr. 25, 2017; 12 pgs.

Office Action regarding related CN App. No. 201511035941; dated Jul. 25, 2017; 3 pgs.

* cited by examiner

LOW COST PERMANENT MAGNET MOTOR FOR AN ELECTRIC POWER STEERING SYSTEM

CROSS-REFERENCE TO RELATED APPLICATION

This patent application claims priority to U.S. Provisional Patent Application Ser. No. 61/905,606, filed Nov. 18, 2013, which is incorporated herein by reference in its entirety.

BACKGROUND OF THE INVENTION

The present invention relates generally to torque assist motors for electric power steering systems and more specifically to a low-cost, injection-molded, buried, permanent magnet motor for use in an electric power steering system.

Permanent magnet brushless (PMBLDC or PMSM) motors may exhibit relatively high torque densities and are therefore useful in industrial drives for high performance applications. Permanent magnet (PM) motors with buried magnets are widely used in variable speed drives. Injection-molded buried permanent magnet (IBPM) motors typically employ materials injected into the rotor core and form rotor poles. This enhances the magnet retention and manufacturing yields for IBPM motors compared to surface-mount permanent magnet (SPM) motors. The retention of magnets is better in IBPM compared to the interior permanent magnet motor (IPM) with a rectangular bar magnet.

Magnet retention can be problematic in an interior permanent magnet motor (IPM) with a rectangular bar magnet, causing manufacturing yields for IBPM motors to suffer. Bar magnets also contribute appreciably to the cost of PM motors.

The placement of magnets inside the magnet pocket of an interior permanent magnet motor (IPM) with a rectangular bar magnet is an issue due to the manufacturing tolerance of both magnet bars and magnet pockets. This magnet placement creates certain ripple torque depending on the slot/pole combination of the motor. For high performance applications, torque ripple is an important challenge for PM motors (PMs) as it creates vibration and speed pulsation. Moreover, cogging torque minimization in IPM motor is more challenging compared to SPM motor as IPM allows smaller air gap and linear skewing or shaping of the magnet cannot be implemented in a feasible way due to the simpler rectangular shape of the PM motor.

Various techniques have been attempted to minimize the cogging torque but conventional techniques tend to add to the complexity and can negatively impact output torque. In addition, in motors employing sintered magnets, the increased complexity can contribute significantly to cost.

Magnet pole shaping, skewing of rotor magnets or stator structures, step-skewing of rotor magnets, combining slots and poles, magnet shaping, and incorporation of dummy notches in the stator teeth have been employed to minimize cogging torque in the PM motors. Unfortunately, however, these conventional techniques have caused other issues to arise. For example, the use of segmented stators, while bringing about improvements in slot fill and manufacturing time of the motor, have also given rise to certain undesirable harmonics, such as a large ninth order harmonic that has been experienced in one motor build and has been attributed to the gaps disposed between stator segments.

Accordingly, it is desirable to have an improved rotor design and techniques for imbedding magnets in rotors of IBPMs for high performance application such as Electric Power Steering. It is desirable to have systems and methods for overcoming issues relating to the ninth order harmonics that are inherent in conventional motors that employ a segmented stator.

SUMMARY OF THE INVENTION

In a one aspect of the invention, an interior permanent magnet motor for providing torque assistance to an electric power steering system of a vehicle comprises a rotor assembly and a stator assembly. The rotor assembly is disposed for rotation within, and relatively to, the stator assembly. The rotor assembly comprises a non-magnetic frame, within which a plurality of magnet poles are distributed about an outer periphery of the non-magnetic frame. The rotor frame and the magnet poles are both formed via an injection molding process.

In another aspect of the invention, a rotor comprises an inner wall and an outer wall. The inner wall forms a space and is radially centered along a central longitudinal axis of the rotor. A first magnetic pair of legs corresponding to a first pole, and a first leg and a second leg of the first magnetic pair of legs are disposed within the rotor. A first angular distance between the first leg and the second leg decreases from the outer wall to the inner wall. The rotor further comprises a second magnetic pair of legs corresponding to a second pole that differs from the first pole. A third leg and a fourth leg of the second magnetic pair of legs are disposed within the rotor to extend radially inward from the outer wall toward the inner wall, a second angular distance between the third leg and the fourth leg decreases from the outer wall to the inner wall.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
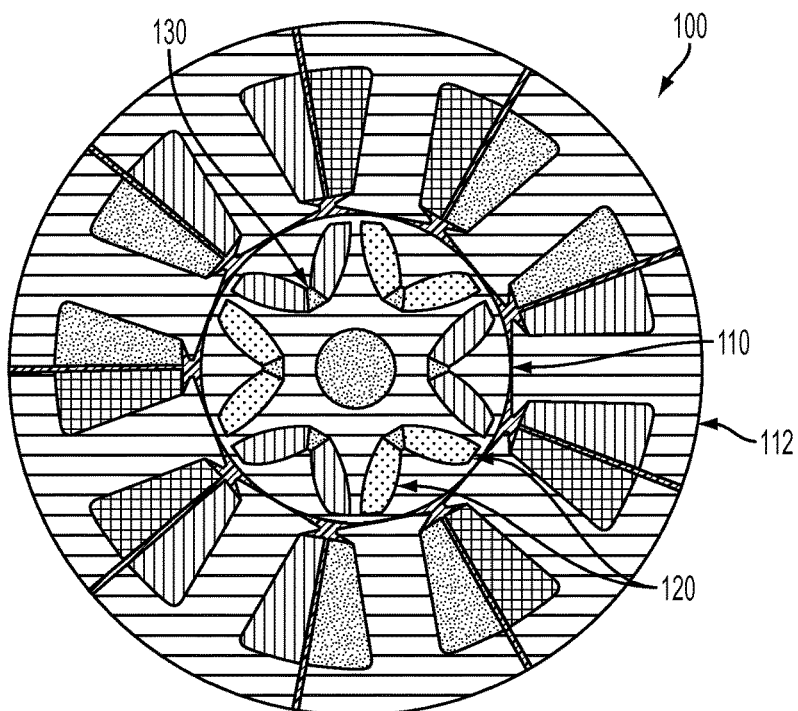
FIG. 1 shows an exemplary motor in accordance with the invention.

Referring now to the Figures, where the invention will be described with reference to specific embodiments, without limiting same, FIG. 1 illustrates an exemplary IPM rotor. As shown in FIG. 1, an exemplary rotor comprises six poles formed by injection molded magnets. In an exemplary embodiment, an injection molded rotor assembly is designed so as to provide performance equivalent to segmented IPMs having sintered magnets. As a result, manufacturing of the rotor assembly is simplified due to the injection molding of the magnets while harmonics associated with magnet placement may be minimized. Further, an IBPM with anisotropic injection molded magnets to minimize the cogging torque, torque ripple will also reduce the cost of an EPS motor.

In an exemplary embodiment, anisotropic injected molded magnets are disposed in the rotor. In an exemplary embodiment, each magnet may be configured as an anisotropic magnet and may be shaped as the letter W or V so as to boost the flux crossing the air gap to the stator. In an exemplary embodiment, the magnet shape is profiled such that during magnetization the magnetic material is appropriately magnetized without leaving any material unmagnetized. In one embodiment, the area (depicted as a non-crosshatched area between the shaded magnets) is filled with non-magnetic material to boost the motor performance. In order to enhance mechanical strength of the rotor, the non-magnetic material is formed integrally with the rotor. This enhances magnet retention and structural integrity of the rotor. Alternatively, the areas may be filled with magnetic material. As a result, concerns related to the retention and placement of the magnet into the rotor may be effectively mitigated. The proposed rotor can be manufactured by using powder metal which will reduce the cost and simplify manufacturing.

FIG. 1 shows an exemplary motor 100 in accordance with the invention, wherein an injection molded rotor assembly 110 is disposed for rotation within and relative to a stator assembly 112. Magnetic pairs of legs 120 and non-magnetic material 130 disposed therebetween are disposed within the rotor 110. The disclosed electric motor design provides a cost effective alternative to existing IPM motor designs while mitigating issues relating to magnet placement within magnet pockets of a rotor.

Figure 2:
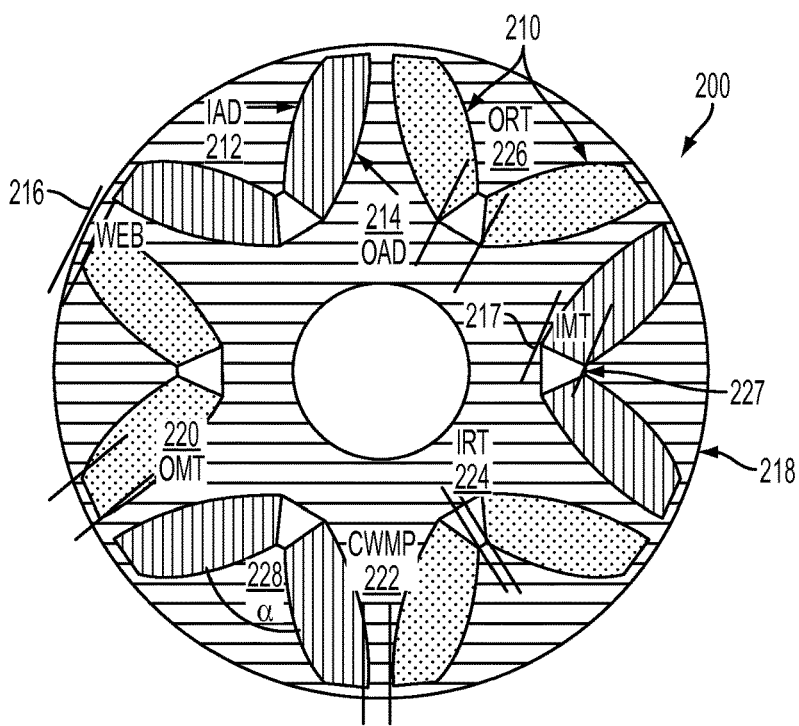
FIG. 2 shows an exemplary rotor in accordance with the invention.

As shown in FIG. 2, the design features of an exemplary rotor 200 in accordance with the invention are provided by the anisotropic injected molded magnets. As shown in FIG. 2, the shapes of magnets, having a magnet inner arc diameter (IAD) 212 and having a magnet outer arc diameter (OAD) 214 being approximately equal to one another and approximately equal to the outer diameter 218 of the rotor assembly. In an exemplary embodiment, as shown in FIG. 2, certain relative dimensions and one is a minimum distance between the magnet and an outer rotor radius (WEB) 216 is provided as shown, as are an inner magnet thickness (IMT) 217, an outer magnet thickness (OMT) 220, an corner width profile of the magnet (CWMP) 222, the inner rib thickness (IRT) 224, and the outer rib thickness (ORT) 226. It should be appreciated that the material of a rib 227 may be either non-magnetic or magnetic. Each magnetic pole includes a pair of legs 210, between which are shown and described an angular distance ($\alpha$) 228.

Thus, FIG. 2 depicts features for an exemplary rotor assembly wherein the magnet shaping parameters of IAD 212, OAD 214, CWMP 222, IRT 224 and ORT 226 maximize an average torque, while also reducing the torque ripple and cogging torque associated therewith. In an exemplary embodiment, the angular distance defined between the two legs of a single magnetic pole, alpha ($\alpha$) 228, is between 0 degrees and 180 degrees, and its specific value is to be chosen based on the desired motor performance as this angle, alpha ($\alpha$) 228, has an important impact on average torque and ripple torque. In an exemplary embodiment, the magnet inner arc diameter (IAD) 212 is chosen such that magnetic material is exposed to the magnetization without leaving any material unmagnetized. This can provide for proper utilization of material while enhancing motor performance.

Figure 3:
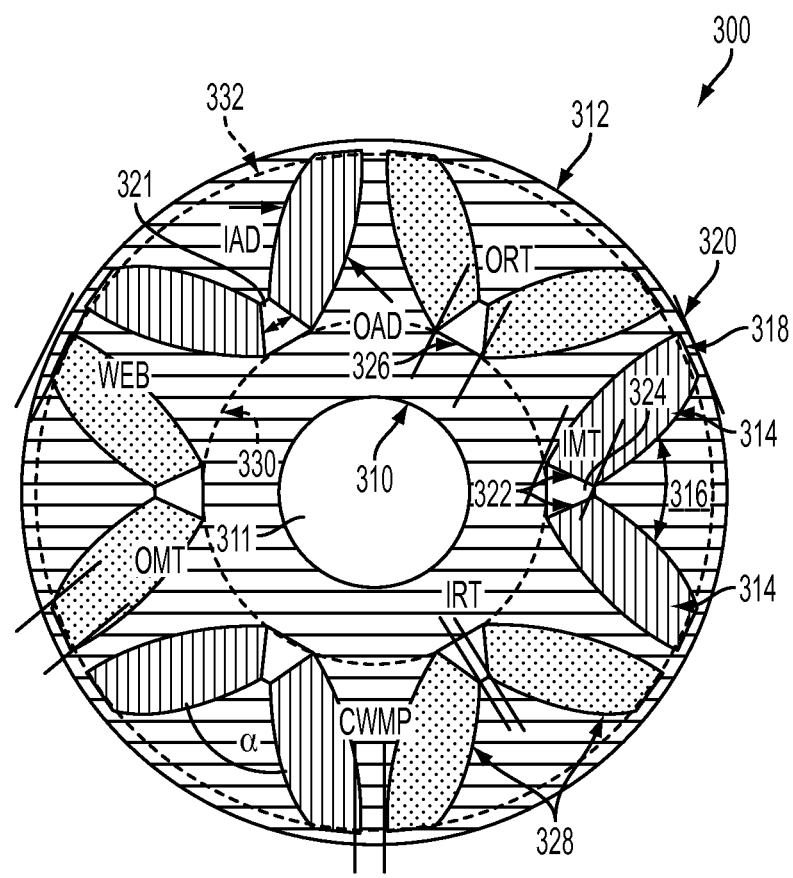
FIG. 3 shows an alternate view of an exemplary rotor in accordance with the invention.

For simplicity, FIG. 3 shows another view of an exemplary rotor 300 in accordance with the invention.

The rotor has an inner wall 310 and an outer wall 312. The inner wall 310 is radially centered along a central longitudinal axis of the rotor 300. The inner wall 310 forms a space, giving the rotor a hollow core for rotation about a shaft 311.

A pair of legs 314 of a single magnetic pole are disposed within the rotor 300. The pair of legs 314 extends radially inward toward the inner wall 310 of the rotor. Each leg of the pair of legs 314 is magnetized substantially uniformly. The pair of legs 314 is disposed in the rotor 300 so that an angular distance 316 between the pair of legs 314 changes as the legs 314 extend radially outward from the inner wall 310 to the outer wall 312. In this embodiment, the angular distance 316 between the pair of legs 314 decreases as measured from the outer wall 312 to the inner wall 310. In other words, moving radially inward toward the inner wall 310, the angular distance 316 between the pair of legs decreases as shown in FIG. 3, forming the wedge or interior of the "v" shape.

In this embodiment, an outer end 318 of each leg runs substantially parallel to an adjacent tangential surface 320 along the outer wall 312. An inner end 322 of each leg is nearest to the inner wall 310 of the rotor 300. The inner end 322 of each leg extends radially inward from the inner wall 310. A second angular distance 321 between each inner end 322 of the pair of legs 314 increases from the inner wall 310 to the outer wall 312.

Each inner end 322 of each leg abuts a non-metallic material 324 filling a cavity disposed in the rotor 300. For example, the non-metallic material 324 may join the inner ends 322 of the pair of legs 314 and an inner surface 326 of the non-metallic material 324 runs parallel to an adjacent tangential surface of the inner wall 310. The non-metallic material 324 is unmagnetized in this embodiment. Additionally, the pair of legs 314 may be substantially oblong in shape as viewed in FIG. 3, with the surfaces of each pair joining the outer end 318 and the inner end 322 of the pair of legs 314, forming a flat arcuate surface. Alternatively, the surfaces extending radially inward may be arcuate and not form an flat surface.

The position of the pair of legs 314 and the non-metallic material 324 allows for rotor material between the inner wall 310 and outer wall 312. This can augment the structural integrity of the rotor 300 and facilitate formation of the cavities for injecting the magnetic material to form the pair of legs 314. In FIG. 3, a minor circumference 330 and a major circumference 332 are spaced from the longitudinal center of the cylinder. The major circumference 332 is spaced at a greater radial distance from the longitudinal axis of rotor 300 than the minor circumference 330. However, both the major circumference 332 and the minor circumference 330 are spaced at radial distances between the inner wall 310 and outer wall 312.

As shown in FIG. 3, the outer ends 318 of the pairs of legs 314 are aligned substantially parallel to the major circumference 332. Consequently, a radial thickness of the rotor exists between the outer wall 312 and outer ends 318 of the pair of legs 314. Alternatively, the pairs of legs 314 may extend to the outer wall 312 and form a surface of the outer wall. The pairs of legs 314 may be shaped so that the pairs of legs 314 are retained in the rotor 300 during rotation.

A surface of the non-metallic material 324 joining the pair of legs 314 is aligned with the minor circumference 330 in the embodiment shown. This allows for a radial thickness between the inner wall 310 and the inner ends 322 of the pair of legs 314.

In the embodiment shown, multiple pairs of legs are spaced around the rotor 300 relative to the longitudinal axis of rotor 300. In this embodiment, the pitch between adjacent legs of different pairs is consistently dimensionally the same around the major circumference 332. In the embodiment shown in FIG. 3, adjacent pairs of legs 314 have different magnetic poles. For example, the pair of legs 314 may both be magnetized as magnetic poles corresponding to "north." Alternatively, the pair of legs 314 may both be as magnetic poles corresponding to "north." The magnetic pole of pairs of legs adjacent to the pair of legs 314 is different than the magnetic pole of the pair of legs 314 in this embodiment. Thus, if the magnetic pole of the pair of legs 314 is "south," the magnetic pole of adjacent pairs of legs is "north." Magnetic poles on adjacent legs are oriented about the circumference 332 as "north," "north," "south," "south," "north," "north," etc.

Figure 4:
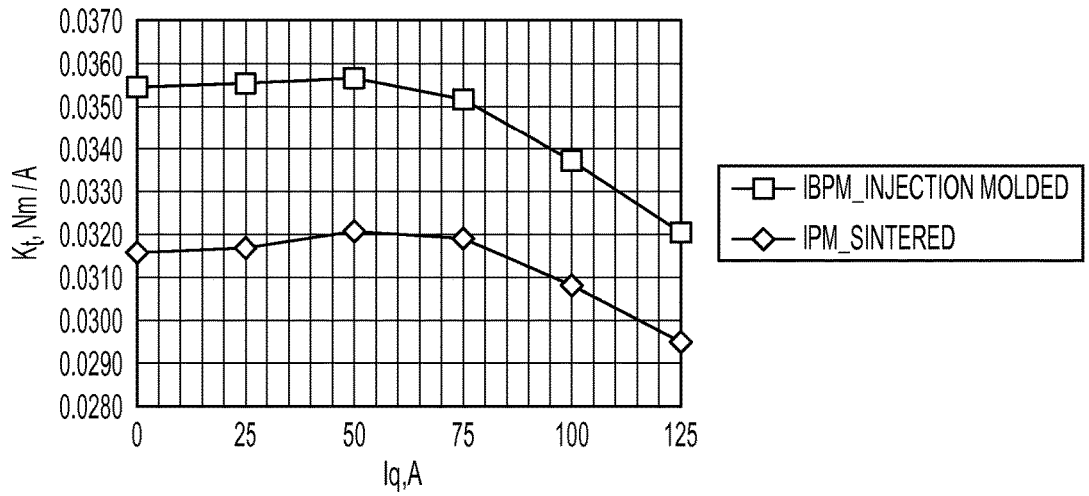
FIG. 4 an exemplary relationship of torque constant ($K_t$) saturation for a injection-molded buried permanent (IBPM) magnet and a sintered IPM relative to a bias current $I_q$.

FIG. 4 shows an exemplary relationship of torque constant ($K_t$) saturation for a injection-molded buried permanent (IBPM) magnet and a sintered IPM relative to a bias current $I_q$. In an exemplary embodiment, the injection molded rotor demonstrates a greater $K_t$ relative to IBPM magnets for a given $I_q$.

Figure 5:
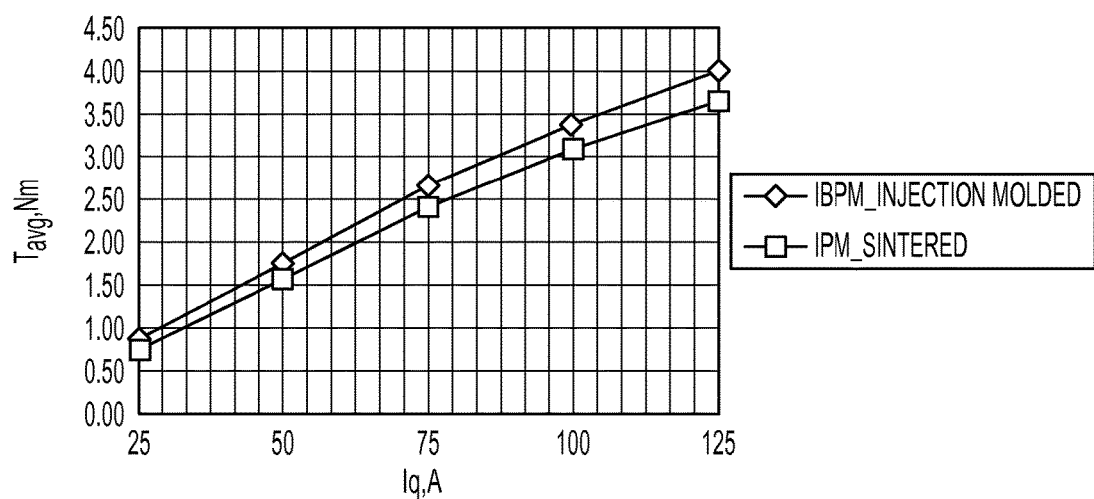
FIG. 5 shows an exemplary relationship of average torque ($T_{avg}$) for a injection-molded buried permanent (IBPM) motor and a sintered IPM.

FIG. 5 shows an exemplary relationship of average torque ($T_{avg}$) for a injection-molded buried permanent (IBPM) motor and a sintered IPM. In an exemplary embodiment, the injection molded rotor demonstrates a greater $K_t$ relative to IBPM magnets for a bias current $I_q$.

As a result, an IBPM motor may employ magnet powder material injected into the rotor core to form each rotor pole. In an exemplary embodiment, magnet retention may be improved, and manufacturing yields for the IBPM motor may also be improved relative to sintered IPM motors. Exemplary embodiments of the invention provide for improved retention of magnets in IBPM motors compared to the Interior Permanent Magnet motor (IPM) with rectangular bar magnets.

In addition, in case of IBPMs, both magnet placement and shaping of motor pole can be implemented, resulting in reductions in the cost of manufacturing relative to motors relying upon conventional sintered magnet rotors.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rotor comprising:
an inner wall and an outer wall, the inner wall forming a space and is radially centered along a central longitudinal axis of the rotor;
a first magnetic pair of legs corresponding to a first pole, a first leg and a second leg of the first magnetic pair of legs are disposed within the rotor, a first angular distance between the first leg and the second leg decreasing from the outer wall to the inner wall, the first leg and the second leg each having an inner arc surface and an outer arc surface, both the inner arc surface and the outer arc surface being curved in a convex manner;
a second magnetic pair of legs corresponding to a second pole that differs from the first pole, a third leg and a fourth leg of the second magnetic pair of legs being disposed within the rotor to extend radially inward from the outer wall toward the inner wall, a second angular distance between the third leg and the fourth leg decreasing from the outer wall to the inner wall, the third leg and the fourth leg each having an inner arc surface and an outer arc surface, at least one of the inner arc surface and the outer arc surface of the third leg and the fourth leg being curved;
a major circumference and a minor circumference, the major circumference spaced at a greater radial distance from the central longitudinal axis of the rotor than the minor circumference, the major circumference spaced inwardly from the outer wall of the rotor, each outer end of the first leg and the second leg oriented parallel to a respective adjacent tangential surface of the outer wall of the rotor; and
inner ends of the first leg and the second leg, the inner ends abutting a non-metallic material disposed in the rotor and between the first leg and the second leg, the non-metallic material comprising a structure.

2. The rotor of claim 1, wherein the non-metallic material is unmagnetized.

3. The rotor of claim 1, wherein the surfaces joining the inner ends and the outer ends of the first leg and the second leg form an arcuate plane.

4. The rotor of claim 1, wherein a second angular distance between inner ends of the first leg and the second leg increases from the outer wall to the inner wall.

5. The rotor of claim 1, wherein a surface of the non-metallic material is adjacent to the minor circumference.

6. The rotor of claim 1, wherein the first magnetic pair of legs and the second magnetic pair of legs are spaced around the rotor to alternate poles of adjacent magnetic pairs of arms.

7. The rotor of claim 1, wherein the inner arc surface and the outer arc surface of the first, second, third and fourth legs have a radius of curvature approximately equal to each other.

8. The rotor of claim 1, wherein the at least one curved surface has a radius of curvature approximately equal to a radius of curvature of the outer wall.

* * * * *